April 17, 1951

E. M. NAVARRO 2,549,510

MILK BOTTLE HOLDER

Filed Feb. 25, 1947

INVENTOR
EUGENE M. NAVARRO
BY
William F. Nickel
ATTORNEY

Patented Apr. 17, 1951

2,549,510

UNITED STATES PATENT OFFICE 2,549,510

MILK BOTTLE HOLDER

Eugene M. Navarro, New York, N. Y.

Application February 25, 1947, Serial No. 730,764

2 Claims. (Cl. 232—41)

This invention is an improved holder designed chiefly for the retention of bottles of milk to be delivered to the consumer, and having a lock to prevent removal by any person other than the purchaser of the milk.

The holder is adapted to be mounted on the outside of an enclosed place of occupation to receive a full milk bottle left by the milkman, who deposits the bottle and locks the holder. The customer takes the bottle out after opening the holder with a key. The holder is so constructed that it can be locked only when a full sealed bottle is placed therein. Hence, an empty bottle can be freely supported in the holder to be extracted by the milkman without a key whenever the customer has an empty bottle to be returned to the producer.

An object of the invention is to provide a holder adapted to secure more than one bottle of milk, and having the locking mechanism disposed in a movable part thereof.

The nature and advantages are clearly explained in the folowing specification, which shows and describes a preferred embodiment of same, the essential characteristics being pointed out in the claims.

Figure 1:
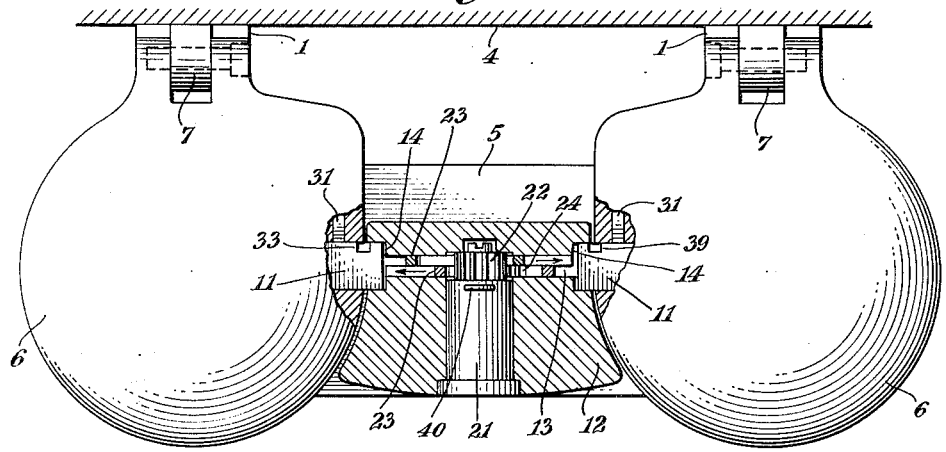
Figure 1 is a top view of my improved milk bottle holder and lock.

The holder comprises two halves each of which receives a bottle, the halves being identical and connected to each other with a single key-controlled locking device for both. An explanation of one half or section will suffice for the pair.

The body of the holder 1 has a part to serve as a bracket, with a rear flat face to engage the outer surface of a door, wall or other support and a pair of outspread supporting arms 2, curved to fit a milk bottle around the top thereof. The body is secured by screws or other fastening devices 3 to the support 4. The two holders are united by a connecting member 5 preferably made integral with each body 1. Each holder includes a top 6 connected to the body by a hinge 7. The body is open at the front between ends of the arms 2, and on the inner sides of the arms are curved ribs 8, from which a milk bottle can be suspended in the holder by engagement of these ribs with the lower side of the expanded rim 9. The bottle 10 is secured in the body by elements including a lock bolt 11 in a channel on the inner face of the cap 6, to be projected into a casing 12 on the member 5 and having a passage 13 through it, open at either end to admit the bolt. This passage has a shoulder 14 at each end, so that only the outer extremity of the bolt can enter it. In the channel 15 is a spring 16 tending to force the bolt outward. The lower edges 17 of the arms 2 curve upward and outward to make them strong enough to serve their purpose, and the gap 18 between the outer ends is filled by a projection 19 extending downward from the rim of the cap 5 in front. When the top 5 is down, the rim of the bottle 10 is completely encircled and the retention of the bottle is certain. The upper edge of each body 1 may be shouldered so that the cap fits nicely and each bolt is bevelled at its outer end on the lower face thereof.

The lock casing 12 is attached to the member 5 by screws 20, for example, and has a cylindrical bore extending into it from the front to receive a lock barrel 21. This barrel carries several tumblers that enter recesses (not shown) in the bore and can be withdrawn by a key in the usual way to allow the barrel to be rotated through a small arc. At its inner end the barrel 21 carries a rigid pinion 22 to mesh with racks 23, side by side, each of which has the form of a closed loop with a projection at one end, the projections pointing in opposite directions, one toward each of the bolts 11 to move the bolts back when the caps 5 are to be raised.

Figure 2:
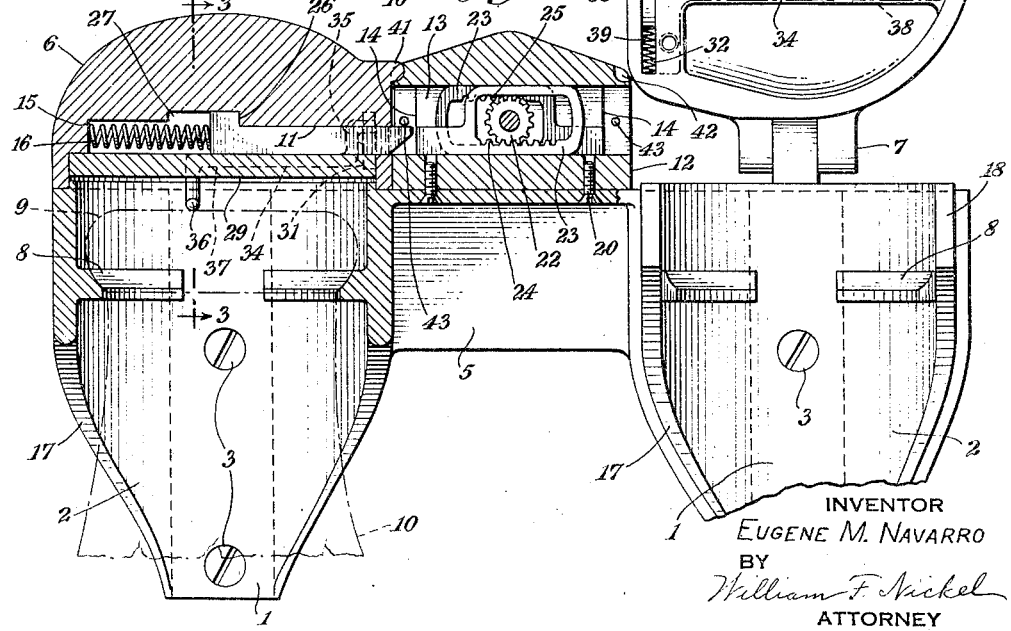
Figure 2 is a section on a transverse plane therethrough.

One rack bar has inside teeth 24 along the lower part and the other has inside teeth 25 along the top. As shown in Figure 2, the pinion 22 meshes with both lines of teeth, and the turning of the pinion will slide the rack bars to move the bolts to allow both at once to enter the casing 12, or to force both of them out of this casing. The motion of the bolts is limited by projections 26 at the inner ends, entering recesses 27 in the bottoms of the channels 15.

The inner face of each cap 6 has a thick transverse projection 28 in which the channel 15 for the bolt is fashioned; and attached to the face of this rib is a retaining plate 29, secured in place by screws in threaded openings 30, or otherwise, to cover the bolt 11 in the cap.

Carried by each cap 5, on the under face, is a catch or stop 31 mounted to slide in a groove 32 extending transversely of the channel 15, and communicating therewith. Between the catch 31 and the closed end of the groove 32 is a compression spring 33. The catch is actuated against this spring 33 by a member 34 having a crank 35 at one end fitting into an opening in the stop 31. The groove 32 is at one side of the cap 5, near the casing 12 and the adjacent part of the plate 29 is shaped to give clearance to the catch. The member 34 is made of a metal rod or wire, and near the middle of the cap it has an arm 36 bent at an angle downward and away from the plane of the crank 35. See Figure 3. The rib 28 has a slot 37 on its inner face parallel to the bolt 10 to receive the part of the member 34 in line with the crank 35, and a recess 38 in the plate 29 connects with the slot 37 to allow movement of the arm 36.

Figure 3:
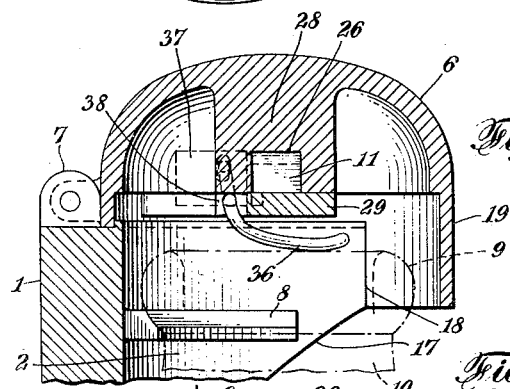
Figure 3 is a section on line 3—3 of Figure 2.

With the parts in the position shown in Figure 3, suppose an empty milk bottle is put into the holder to be taken out by the milkman and replaced by a full sealed bottle of milk. The cover or cap 6 is raised and the neck of the empty bottle is inserted between the arms 2, whereupon the exterior bead of the rim 9 of the bottle 10 rests upon the ribs 8. The cap 6 is now lowered and the bevelled outer end of the bolt 11 will press down on the casing 12. Thus the bolt 11 is forced back to retracted position at first in the channel 15. The catch 31 is now moved into the notch 39 in the side of the bolt by its spring 33, and the arm 36 swings down into the mouth of the bottle 10, because the mouth has no closure but is fully open. The space between the outer ends of the arms 2 is closed by the depending flange 19 of the cap 6 and cooperates with the ribs 8; but the empty bottle can be moved because the cap is free to be lifted while the catch 31 obstructs the bolt 11 and prevents it from projecting into the passage 13 of the casing 12.

Upon the removal of the empty bottle by the milkman, and the substitution of a full and sealed bottle of milk therefor, a different result is obtained. The bottle 10 is shown in Figure 3 as with a bonnet or head closure over the mouth of the bottle, but a similar action can be had if a disk closure for the full bottle of milk is utilized, the parts being shaped and located accordingly.

The neck of the bottle 10 is inserted between the arms 2 after the cap 6 has been raised, and the bottle is suspended as before from the ribs 8 on which the rim of the bottle rests. Upon the closing of the cap 6, the arm 36 of the controlling member 34 strikes the closure of the bottle, and a further downward movement of the cap 6 pushes up the arm 36 and rotates the member 34, so that the crank 35 pushes the catch 31 against the spring 32 out of the path of the bolt 11, clearing the recess 39. Thereupon the end of the bolt 11 is projected into the casing 12 by the spring 15. The cap 6 is thus secured against upward movement and the bottle of milk cannot be removed except by the use of a key in the lock 21 to withdraw the bolt 11. One of the tumblers of the barrel 21 is indicated at 40, but the usual number will be mounted in the barrel 21.

The holder has space enough to accommodate the upward displacement of the closure should the contents of the bottle expand by reason of becoming frozen during cold weather. On each cap 5 a projection 41 fits into a recess 42 on the casing 12, to prevent the insertion of a tool into the passage 13, should one try to tamper with the holder. The drawings show two holders, side by side, with the body 1 of each joined to the other by a connecting member 5, supporting the casing 12, which houses the bolts and the locking mechanism for both holders. One full bottle of milk or two can be secured in this holder.

The casing 12 can of course be welded to the member 5, or cast in one piece therewith. Also the lower end of the arm 36 can be weighted if desired to act more effectively against the spring 33. The ends of the passage 13 have stops 43 in front of the shoulders 14 to prevent up and down play of the caps 6 when the bolts 11 project into the casing 12.

The invention set forth above is quite similar to the improvements disclosed in my copending applications Serial Nos. 730,762, now abandoned, and 730,763, filed on the same date as this application for improvements in Milk Bottle Holders, the former case disclosing a construction having a special type of bolt carried by the main support, and the latter another form of milk bottle holder having the bolt carried by the cap and a different type of controlling device therefor. None of the features of the improvements of the two aforesaid prior applications is recited in the claims hereof.

While I have shown and described what I consider to be the most practical embodiment of my invention, I wish it to be understood that such changes as come within the scope of the appended claims may be resorted to when desired.

Having thus described the invention, what I claim as new and desire to secure by Letters Patent of the United States is:

1. A holder comprising a pair of bodies each having a portion forming a supporting bracket to secure the holder in place, a pair of outspread arms attached to each bracket, a connecting member joining an arm of one body to an arm of the other, a cap hinged to each body, a casing on the connecting member between the caps, said casing having a passage therethrough between the caps and open at each end, a bolt mounted in each cap to enter the adjacent end of the passage, mechanism carried by the casing, rack bars side by side in said passage and having openings in said passage, one of said rack bars having gear teeth along its upper inner edge and the other having gear teeth along its lower inner edge, and a pinion engaging the upper and lower teeth of said racks, the pinion being united to the lock mechanism to operate the rack bars and force the bolts to retracted positions in the caps.

2. A holder comprising a pair of bodies having portions forming brackets to secure the holder to a support, a pair of outspread arms attached to each bracket, a connecting member joining an arm of one body to the arm of the other bracket, a casing on said connecting member, a cap hinged to each body to swing vertically toward and away from their corresponding pairs of arms, a bolt carried by each cap to secure each of the caps, locking mechanism in the casing, a pair of oppositely movable rack bars in said casing arranged in side by side relation having oppositely positioned teeth and positioned to simultaneously engage the ends of said bolts and displace the same from their securing position, and a pinion drivingly engaging said opposite teeth for connecting said lock mechanism to said oppositely movable racks, whereby operation of said locking mechanism will actuate said racks in unison.

EUGENE M. NAVARRO.

REFERENCES CITED

The following references are of record in the file of this patent:

UNITED STATES PATENTS

| Number | Name | Date |
| --- | --- | --- |
| 1,054,112 | Handschuh | Feb. 25, 1913 |
| 1,079,978 | Dunn | Dec. 2, 1913 |
| 1,089,324 | Chesley | Mar. 3, 1914 |
| 1,104,076 | Simmons | July 21, 1914 |
| 1,667,559 | McCaleb | Apr. 24, 1928 |
| 2,038,421 | Danna | Apr. 21, 1936 |
| 2,231,647 | Warren | Feb. 11, 1941 |
| 2,304,941 | Mantz | Dec. 15, 1942 |